July 3, 1934.	G. A. LYON	1,965,527
COVER FOR SPARE TIRES OF AUTOMOBILES
Filed Dec. 24, 1928
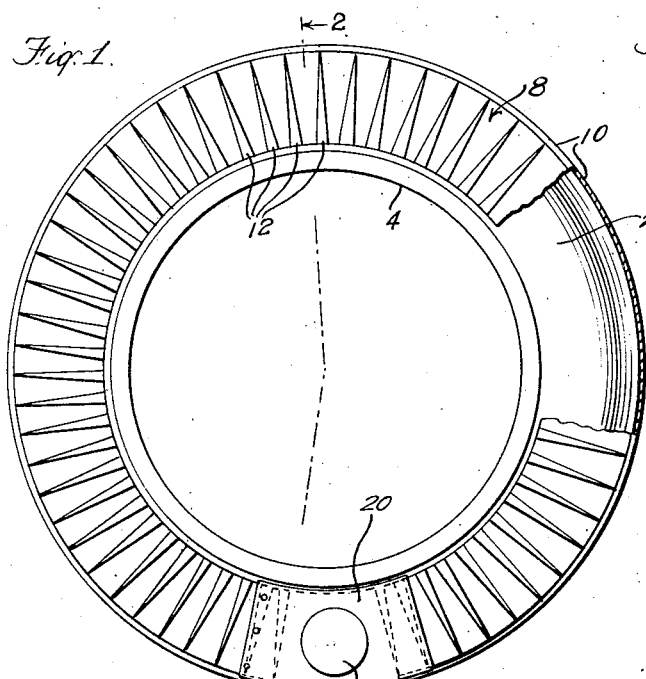
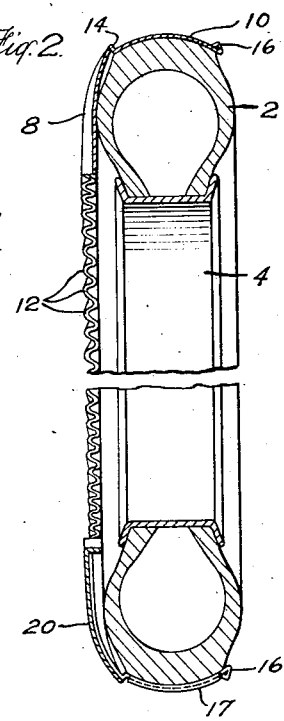
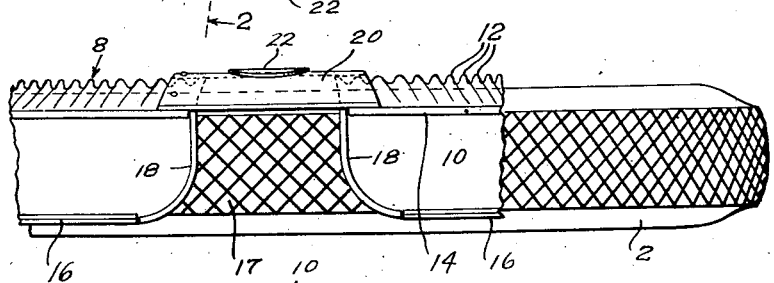
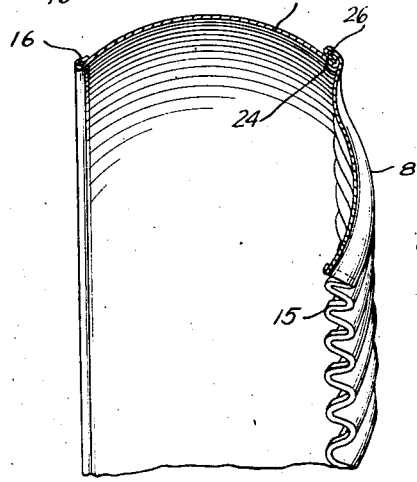
INVENTOR
GEORGE ALBERT LYON
BY
ATTORNEYS Patented July 3, 1934

1,965,527

UNITED STATES PATENT OFFICE 1,965,527

COVER FOR SPARE TIRES OF AUTOMOBILES

George Albert Lyon, Allenhurst, N. J., assignor to Lyon Incorporated, Asbury Park, N. J., a corporation of Delaware Application December 24, 1928, Serial No. 328,119

REISSUED

19 Claims. (Cl. 150—54)

This invention relates to covers for spare tires carried upon automobiles.

The usual spare tire cover consists of a canvas casing coated with waterproofing material and formed to fit the contour of the spare tire and carrier. These tire covers are unattractive in appearance and are subject to shrinkage so that they are difficult to apply to a tire after having been in use for a relatively short time. Such casings often cannot be applied to a tire so that they will fit the tire smoothly. They also wear out quickly and are readily torn, particularly when struck by another car, as often happens in congested traffic conditions. Such covers do not constitute a satisfactory protection for the tire against damage in case of collision. The ordinary tire cover, since it is made of highly flexible material, not only wrinkles readily, but when applied to a tire, conforms to the projections and depressions on a tire so that it does not present a smooth outer surface.

The principal objects of the present invention are to improve the construction and mode of operation of spare tire covers and to produce a cover which will present a highly attractive appearance, which will furnish a satisfactory protection for the tire, and which may be readily applied to and removed from the tire.

With these and other objects in view, the invention comprises the novel and improved features, constructions and combinations of parts hereinafter described and particularly pointed out in the claims, the advantages of which will be readily understood and appreciated by those skilled in the art.

The invention will be clearly understood from the accompanying drawing illustrating the invention in its preferred form and the following detailed description of the constructions therein shown.

In the drawing—

Fig. 1 is a view in front elevation of a spare tire with a tire cover embodying the invention applied thereto;

Fig. 2 is a sectional view taken substantially on the line 2—2 of Fig. 1;

Fig. 3 is an underside plan view showing portions of the tire cover and tire; and Fig. 4 is a sectional view illustrating a modified form of tire cover.

The tire cover is shown in the drawing of this application applied to a tire indicated at 2 mounted on a rim 4. In the form of the invention shown, the tire cover consists of a divided ring of relatively stiff resilient sheet material, such as sheet metal, and is formed to cover the periphery of the tire and the side of the tire which occupies the outer position when the tire is supported on a car. The tire cover comprises a part 8 constructed to extend from the periphery of the tire inwardly over the side of the tire, and a part 10 formed to extend about the periphery of the tire. The part 8 of the cover and the part 10 thereof are preferably secured rigidly together and may be formed from a single piece of sheet metal, as shown in Fig. 1.

The part 8 of the cover is formed with a series of tapered corrugations indicated at 12, these corrugations diminishing in width from the inner margin of the side portion to the outer margin thereof. This part of the cover, as shown in Fig. 2, is concavely curved from its outer margin to the central portion thereof opposite the high point in the convex side portion of the tire, and from this point extends inwardly in a general plane substantially parallel with the central plane of the tire. The part 8 preferably is arranged to engage the convex side portion of the tire at the high point thereof, as shown in Fig. 2. A shoulder 14 is preferably formed at the juncture of the side portion 8 of the cover with the peripheral portion 10 thereof. The inner margin of the part 8 is preferably turned back upon the body of said part, as indicated at 15, to form a finished edge.

The part 10 of the cover is concave upon its inner side so as to fit over the tread portion of the tire in the manner shown in Fig. 2. The part 10 preferably extends slightly beyond the tread portion of the tire on each side thereof, the tread engaging in the concavity in this part. The inner margin of part 10 is turned outwardly at an angle to the body of the same, as indicated at 16, so as to form a finished rounded edge.

The parts 8 and 10 of the cover form an expansible and contractible divided ring shaped to fit about the tire. This ring is so constructed that it is normally somewhat smaller in size than required to fit the tire to which it is to be applied, and is expanded in applying the ring to the tire. The ring is constructed so as to provide a space between the ends of the ring, indicated at 17, when it is applied to a tire, as clearly shown in Fig. 3. In order to cover the side of the tire between the ends of the part 8 of the cover, a cover plate 20 is secured to one end of said part and is arranged to overlap the other end of the same, as shown in Figs. 1 and 3. This plate is provided with a bordered area 22 to which the initials of the owner of the car may be applied.

Fig. 4 shows a construction in which the parts 8 and 10 of the cover are made from separate sections of sheet metal and are secured together in the process of manufacture. As shown in this figure, the part 8 is provided with a folded margin 24 and the part 10 is provided with a folded margin 26 arranged to interfit with the folded margin of the part 8. In securing the two parts together, the folded margins of the same are interfitted and then subjected to pressure to lock them securely together.

It will be noted that in the construction shown in Fig. 4, the part 8 of the cover has a somewhat different cross-sectional curvature than the corresponding part shown in Fig. 2. As shown in Fig. 4, the part 8 on the inside thereof is convexly curved from its outer margin for a short distance toward the inner margin and from this point to its inner margin is concave.

The tire cover may be conveniently applied to the tire by first placing the tire in a horizontal position on the ground or on any other suitable support. In applying the cover to the tire, the cover is expanded so that the part 10 will pass over the periphery of the tire, and is positioned with the part 10 extending about the periphery of the tire and with the part 8 engaging the outer side of the tire. Upon the release of the cover after its expansion, the resiliency of the material will cause the same to contract upon the tread portion of the tire. The grip of the part 10 upon the periphery of the tire will securely hold the tire cover in position. The cover may be readily removed from the tire by expanding the same and removing it laterally from the tire. The corrugations in the part 8 of the cover give the cover a high degree of resiliency and enable the same readily to be expanded and to contract in removing the cover from and applying the same to a tire.

The construction shown in Figs. 1, 2 and 3 may be readily manufactured from a strip of sheet metal by rolling out the metal between suitably shaped rollers. The metal is preferably rolled out in a cold condition so as to give the same a high degree of resiliency. In the manufacture of a cover of the form shown in Fig. 4, the parts 8 and 10 of the cover may be separately shaped into the general form shown in these figures from strips of sheet metal by rolling operations.

The tire cover above described presents a highly attractive appearance and furnishes a reliable, satisfactory protection for the tire. The corrugations 12 in the cover radiating from the axis of the tire, greatly enhance the attractiveness of the appearance of the cover, particularly when the outer surface of the part 8 has a high polish. The tire cover may be applied to and removed from the tire by simple, easy and convenient manual operations and will be securely held on the tire by the spring of the metal. The cover also has the advantages that it is simple in construction and that it may be manufactured by machine operations.

The tire cover occupies very little space at the side or about the periphery of the tire so that the tire with the cover applied thereto will fit in a socket or well in the running board, with which many cars are at present provided. When the tire with the cover applied is placed in the socket, the cover cannot be removed from the tire without first removing the tire from the socket. Thus the locking of the tire in the well also locks the cover in position.

It will be understood that except as defined in the claims, the invention is not limited to the particular construction and arrangement of parts of the illustrated embodiment of the invention, but that the invention may be embodied in other forms within the scope of the claims.

Having explained the nature and object of the invention, and having specifically described a construction embodying the invention in its preferred form, what is claimed is:

1. A cover for spare tires comprising a radially expansible and contractible split ring of relatively stiff sheet material arranged to cover the outer side of a tire and to extend about the periphery thereof and having the part covering the side of the tire provided with transverse corrugations.

2. A cover for spare tires comprising a divided substantially continuous expansible and contractible elastic ring comprising a part of relatively stiff sheet material, having transverse corrugations and arranged to cover a side of a tire, and a part of relatively stiff elastic sheet material rigidly attached to said corrugated part and arranged to extend about the periphery of the tire, the latter part being formed somewhat smaller than the outside diameter of the tire so that it will grip the tire by reason of the elasticity of the material.

3. A unitary spare tire cover for protecting a spare tire mounted on a tire carrier including a flexible side portion formed to cover the outer side wall of the spare tire and an expansible and contractible arcuate rim-like portion formed integral with said side portion for covering the outer periphery of the tire and having an inherent tendency to resist pressure as it is snapped into position on the tire, said rim-like portion having an opening at one end smaller than the diameter of the tire and being so shaped and proportioned that when in tire protecting position an inner edge of the same will be spaced inwardly from the outermost periphery of the tire such a distance as to hold the cover in position and yet permit of the snapping of the rim portion into proper tire protecting position on the outer periphery of the tire.

4. A unitary spare tire cover for protecting a spare tire mounted on a tire carrier including a substantially continuous and flexible circular side portion formed to cover the outer side wall of the spare tire and an expansible and contractible integral open bottom rim portion of circular form associated with said side portion and projecting laterally from it across the median plane of the tire and being of a radius to enable it to closely fit over the tire and to extend clear across substantially the entire width of the tire tread as well as about more than one-half of the outer periphery of the tire, said rim portion having an inner margin thereof formed to extend inwardly from the outermost periphery of the tire so as to engage over the other and rear side of the tire to a sufficient extent as to retain the cover on the tire in proper tire protecting position and yet being of sufficiently narrow width as to permit of the ready snapping of said rim portion into proper tire protecting position, said side portion being transversely flexible and yet non-collapsible.

5. An automobile tire cover comprising an arcuate and radially non-collapsible ring of convexly curved cross sectional form having an opening at one end smaller than the diameter of the tire and being so shaped and proportioned as to enable it to be bodily pushed onto the tire and to thereafter substantially cover the exposed outer side wall and tread portions of the tire when mounted on an automobile leaving the rear side of the tire exposed, said ring having a rear resilient marginal edge portion of lesser diameter than that of the tire and formed to overhang the tire tread at the rear of the tire so as to prevent lateral displacement of the cover, said edge extending about substantially more than 180° of the tire periphery and being circumferentially contractible into cover retaining engagement with the tire.

6. In a substantially non-collapsible automobile spare tire cover of convexly curved cross section having an opening at one end smaller than the diameter of the tire and being adapted to be bodily pushed over the exposed portion of the tire and into a snug fit therewith, an inwardly projecting circumferentially extending retaining means formed to extend continuously about substantially more than one half of the outer tire periphery and being of relatively narrow width and expansible and contractible into retaining engagement with the rear side of the tire tread.

7. An automobile spare tire cover for protecting and snugly fitting a spare tire including a side portion formed to be disposed over the outer side wall of the spare tire, said side portion maintaining itself in substantially the same annular form both while in use and while off the tire, and an arcuate open bottom rim-like portion associated therewith to be disposed over the outer periphery of the tire and having an inherent tendency to resist pressure as it is placed into position on the tire, said rim-like portion being so shaped and proportioned that when in tire protecting position an inner and contractible part of the same will be spaced inwardly from the outer periphery of the tire such a distance as to hold the cover in position and yet permit of the moving of the rim portion into proper tire protecting position over the outer periphery of the tire, said rim-like portion including its said inner part extending around substantially more than one half of the tire periphery to enable said inner part when in engagement with the tire to retain the cover against upward displacement from the tire.

8. An automobile spare tire cover for protecting a spare tire including a substantially continuous arcuate side portion formed to be disposed over the outer side wall of a spare time and to maintain itself in substantially the same annular form both while in use and while off the tire and an open bottom rim portion of arcuate form associated with said side portion and projecting laterally from it over the median plane of the tire and being of a radius to enable it to closely fit over the tire and to extend over substantially the entire width of the tire tread as well as about substantially more than one-half of the outer periphery of the tire, said rim portion having an inner circumferentially extending marginal part thereof formed to extend inwardly from said rim portion so as to engage over the other and rear side of the tire periphery to a sufficient extent as to retain the cover on the tire in proper tire protecting position and yet being expansible and of sufficiently narrow width as to permit of the ready pushing of said rim portion over the outer periphery of the tire and into proper tire protecting position.

9. A spare tire cover for protecting a spare tire mounted on a tire carrier including a single side portion substantially circumferentially rigid and of arcuate shape formed to cover the outer side of the tire and an open bottom rib to cover the periphery of the tire and of sufficient length to extend around substantially more than one-half of the periphery of said tire, said side portion aiding at the outer side of the tire to retain said rim from radial spreading with respect to said side portion, said rim including a portion projecting laterally from said side portion across the median plane of the tire and being of a radius sufficient to enable it to snugly fit over the tire, and means associated with said rim portion for retaining said rim portion on said tire, said means terminating at such a distance inwardly from the outer periphery of said tire at the other and inner side of said spare tire as to serve as a retaining means after said cover is in proper tire protecting position and at the same time being resiliently expansible to permit of the shoving of said side and rim portions substantially bodily into and out of said proper tire protecting position, said means also being substantially circumferentially continuous about the rear side of the outer periphery of the tire for cover retaining cooperation with substantially more than 180° of said periphery.

10. As an article of manufacture, a cover for spare tires comprising a divided expansible and contractible elastic ring including a part of relatively stiff sheet material having transverse corrugations and arranged to cover a side of the tire and a separate and second part of relatively stiff elastic sheet material connected to the corrugated part and arranged to extend about the periphery of the tire, the latter part being formed somewhat smaller than the outside diameter of the tire so that it will grip the tire by reason of the elasticity of the material.

11. As an article of manufacture, a cover for spare tires comprising a divided expansible and contractible elastic ring including a part of relatively stiff sheet material having transverse corrugations and arranged to cover a side of the tire and a separate and second part of relatively stiff elastic sheet material connected to the corrugated part and arranged to extend about the periphery of the tire, the latter part being formed somewhat smaller than the outside diameter of the tire so that it will grip the tire by reason of the elasticity of the material, said two parts being circular in form and being split to enable their application to the tire.

12. As an article of manufacture, a cover for spare tires comprising a part of relatively stiff sheet material arranged to cover the outer side of the tire and having a series of transverse alternate ridges and grooves therein and a separate part connected to the first part and being formed of sheet material arranged to extend about the periphery of the tire.

13. As an article of manufacture, a cover for spare tires comprising a part of relatively stiff sheet material arranged to cover the outer side of a tire and having a series of transverse alternate ridges and grooves therein increasing in width from the outer portion of said part toward the inner margin thereof and a second and separate part of sheet material connected to the first part and adapted to extend about the periphery of the tire.

14. As an article of manufacture, a cover for spare tires comprising a radially expansible and contractible ring of relatively stiff sheet material having a part interlocked therewith provided with transverse corrugations arranged to cover the outer side of a tire.

15. As an article of manufacture, a cover for spare tires comprising a part of relatively stiff sheet material provided with transverse alternate ridges and grooves arranged to cover the outer side of the tire and a rim part formed to extend about the periphery of the tire and having one edge interlocked with an edge of the first mentioned part.

16. An automobile spare tire cover comprising a side piece for disposition over a side wall of a tire, and a split, resiliently expansible and contractible ring piece associated therewith for disposition over the tread of the tire, one of said pieces being corrugated to augment the expansible and contractible characteristics of the cover.

17. An automobile spare tire cover comprising a split annular side piece for disposition over the side wall of a tire and a split, resiliently expansible and contractible ring piece associated therewith for disposition over the tire tread, said side piece being corrugated to augment its expansible and contractible characteristics.

18. A cover for spare tires comprising a radially expansible and contractible split ring of relatively stiff sheet material arranged to cover the outer side of a tire and to extend about the periphery thereof and having the part covering the side of the tire provided with transverse corrugations.

19. A cover for spare tires comprising a divided substantially continuous expansible and contractible elastic ring comprising a part of relatively stiff sheet material, having transverse corrugations and arranged to cover a side of a tire, and a part of relatively stiff elastic sheet material rigidly attached to said corrugated part and arranged to extend about the periphery of the tire, the latter part being formed somewhat smaller than the outside diameter of the tire so that it will grip the tire by reason of the elasticity of the material.

GEORGE ALBERT LYON.